Jan. 27, 1959   C. A. GALLAGHER   2,871,475
DETECTOR FOR VISUAL AND AURAL DIRECTION FINDERS
Filed June 11, 1954

INVENTOR
CORNELIUS A. GALLAGHER
BY
Mitchell Bedert
ATTORNEYS

United States Patent Office 2,871,475
Patented Jan. 27, 1959

2,871,475

DETECTOR FOR VISUAL AND AURAL DIRECTION FINDERS

Cornelius A. Gallagher, Hicksville, N. Y., assignor to Servo Corporation of America, New Hyde Park, N. Y., a corporation of New York Application June 11, 1954, Serial No. 435,983

8 Claims. (Cl. 343—113)

My invention relates to an improved detector circuit having particular application to radio-direction finders.

It is an object of the invention to provide an improved circuit of the character indicated.

A specific object is to provide simplified circuit means for improving the sharpness of nulls, used to identify direction-finder bearings.

It is a general object to meet the above objects with a structure which inherently improves the ease of interpretability of visual and aural direction finders, whether of the continuously rotated or manually rotated variety.

Other objects and various further features of novelty and invention will be pointed out or will occur to those skilled in the art from a reading of the following specification, in conjunction with the accompanying drawings. In said drawings.

Figure 1:
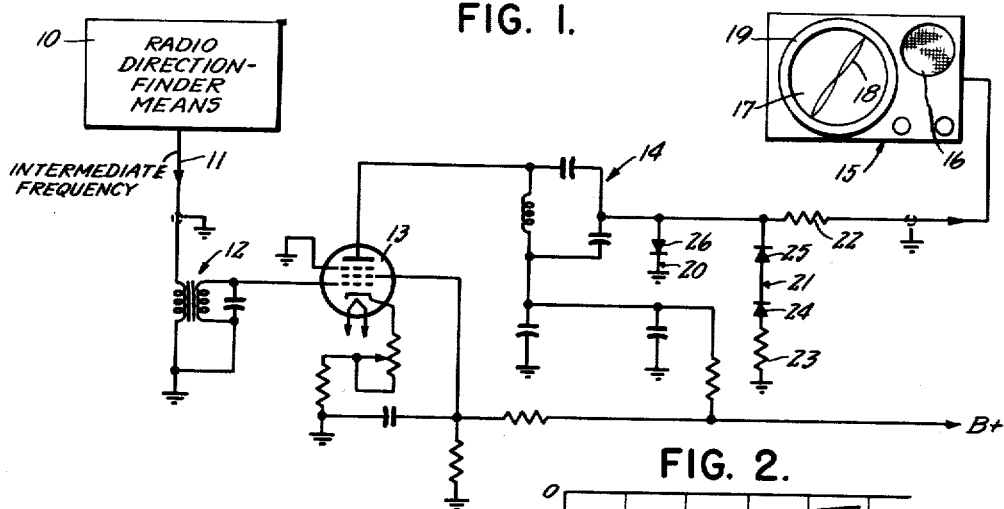
Fig. 1 is an electrical diagram illustrating a circuit embodying features of the invention.

Briefly stated, the invention contemplates improved means for sharply defining the null of the received signal in a null-type direction finder, in order to improve the bearing readability, whether the direction finder be of the automatic visual variety or a manually operated aural device. Null-sharpening is achieved through the action of a detector circuit embodying a network of elements having non-linear properties in the vicinity of zero volts, which is the region of interest in null interpretation.

Referring to the drawings, my invention is shown in application to radio-direction-finder means 10 which may develop, in an output line 11, a radio frequency, or an intermediate frequency having envelope modulation from which the null is to be interpreted to identify a bearing. For the case depicted, the signal output at 11 is the intermediate frequency, coupled by transformer means 12 to an intermediate-frequency amplifier 13. The output of amplifier 13 includes a tank circuit 14, resonant at the intermediate frequency, and coupled to display means 15 by means of a detector circuit incorporating features of the invention.

The display means 15 may include a speaker 16 for aural presentation. Alternatively or additionally, means 15 may include a visual display 17, as presented on the face of a cathode-ray tube with the familiar "propeller" pattern 18, in which the radially outer tips represent signal nulls and are read off an azimuth scale 19 to identify bearings.

Figure 3:
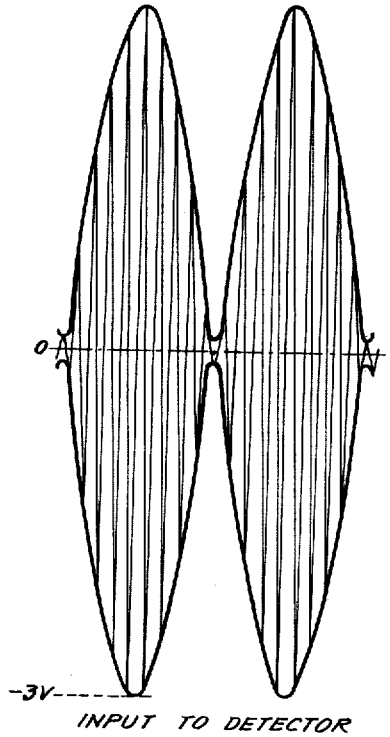
Figs. 3 and 4 are wave-form diagrams illustrating operation of the circuit of Fig. 1.

In accordance with the invention, I provide a novel detector circuit having strongly non-linear characteristics in the vicinity of zero volts and, therefore, capable of more sharply defining the null in the envelope of signals extracted from tank circuit 14. Without my null-sharpening means, the envelope would appear of generally the form displayed in Fig. 3, in which it will be seen that nulls are not sharp.

My circuit comprises essentially a rectifier consisting of two arms 20—21, which together may constitute the output or load impedance for the tank circuit 14, and across which output connections are made through a resistor 22 to the display means 15; resistor 22 may function with the stray circuit capacity of a connection line (e. g. coaxial cable) to define a filter for smoothing the rectifier output. In order to provide means across which a voltage can always be detected, I show a load resistor 23 in the arm 21, and have provided two non-linear rectifying elements 24—25 in this arm. For best operation, I prefer that the combined maximum forward resistance of the elements 24—25 shall be a substantial fraction (and preferably of the order of magnitude) of the resistance 23. The other arm 20 may include another rectifying element 26 of reverse polarity with respect to the elements 24—25.

As noted above, I prefer that the maximum forward resistance of the diodes 24—25 shall be of the order of magnitude of the resistor 23. This may be achieved by employment of one diode only, say the diode 24 in series with a smaller resistor 23, but two diodes 24—25 provide for a greater and more desirable load resistance.

Figure 2:
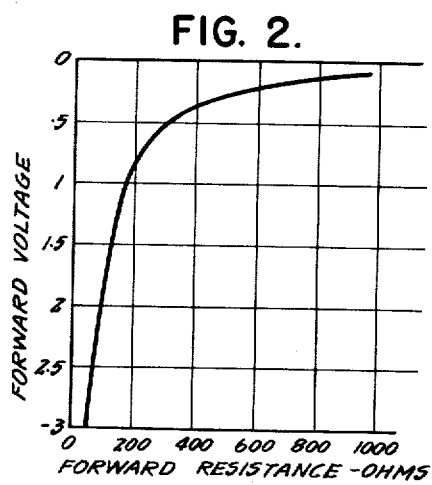
Fig. 2 is a graphical display of a preferred characteristic of circuit elements in Fig. 1.
Figure 4:
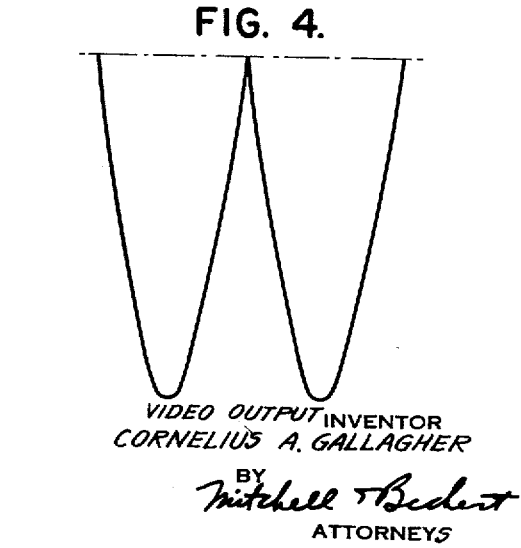

In addition to the primary function of demodulating received signals, the detector network performs the secondary function of sharpening the "propeller" pattern 18; this is apparent from Fig. 4, which depicts a typical oscilloscopic observation of the output of the detector. The sharpening at the nulls is attributable to the strongly non-linear charaacteristics of the rectifiers 24—25—26, which may be germanium diodes, having characteristics as shown in Fig. 2. The non-linear characteristics occur predominantly in the vicinity of zero volts; the input wave form is, therefore, substantially altered at low-voltage current flow. Since this non-linear characteristic involves an increase in resistance at low-voltage levels, the current relied upon to develop detector output is markedly and non-linearly decreased for the lower voltage levels, and sharpening results.

In operation, during the positive half of an intermediate-frequency cycle, the arm containing the rectifying element or diode 26 conducts and provides a low-impedance path across the tank capacitor, thereby clipping off the positive half of the cycle. On the negative half of the cycle, the other arm 21 (containing diodes 24—25) conducts. For relatively high negative amplitudes of the intermediate-frequency signal, the diodes 24—25 act as very low resistance elements, and the total resistance of the arm 21 is dominated by the resistance 23. As the modulation envelope approaches the null, the resistance of arm 21 rises sharply, approaching double the value of resistance 23, for small fractions of a volt across the tank 14, thus effectively raising the "Q" of the tank and enabling a larger-than-normal output directly adjacent the null point. The filter defined by resistor 22 and the capacitance (looking into the connection line, e. g. coaxial cable, connecting resistor 22 to the display means 15) converts the train of negative intermediate-frequency pulses into the envelope shown in Fig. 4.

It will be seen that I have described a relatively simple circuit providing improved performance for null-type direction finders, whether of the visual or aural variety, or of the continuously rotated or manually rotated variety. One of the outstanding features of my circuit is that overall amplitude of the input signal is relatively unimportant, since the sharpening action takes place only in the vicinity of the null. Null emphasis is noted on very weak signals. Furthermore, no signal-degradation takes place, as is the case for the more conventional square-law sharpening method, in which interfering signals are emphasized.

While I have described the invention in detail for the preferred form shown, it will be understood that modifications may be made within the scope of the invention as defined in the claims which follow.

I claim:

1. Direction-finder means, comprising a radio receiver including detector means and display means with means for presenting nulls of the envelope output of said detector means, said receiver further including circuit means developing an A.-C. output and coupled to said detector means, the output of said circuit means being solely capacitatively connected to ground, said detector means comprising a rectifier with germanium diodes in each of two grounded arms thereof, the diode polarity in one arm being opposite to that in the other arm, and a load resistance in one of said arms to the exclusion of the other of said arms.

2. Direction-finder means, comprising a radio receiver including detector means and display means with means for presenting nulls of the envelope output of said detector means, said receiver further including circuit means developing an A.-C. output, a reference connection capacitatively isolated from said output, said detector means comprising two parallel arms connected between said circuit output and said reference connection, a half-wave rectifier in one of said arms, a half-wave rectifier of opposite polarity in the other of said arms, and a load resistor in one of said arms to the exclusion of the other of said arms.

3. Direction-finder means according to claim 2, in which the rectifier in the arm including said resistor has a strong saturation characteristic in the vicinity of zero volts.

4. Direction-finder means, comprising a radio receiver including detector means and display means with means for presenting nulls of the envelope output of said detector means, said receiver further including circuit means developing an A.-C. output, a reference connection, said detector means comprising two arms connected in parallel across said output to said reference connection, a poled half-wave rectifier element in one arm, two half-wave rectifier elements in the other arm and polarized oppositely to that of said first-mentioned rectifier element, and a load resistor in that one arm which has the greater overall rectifier resistance.

5. Direction-finder means according to claim 4, in which the maximum resistance of the rectifier means in the arm containing the resistor is of the order of magnitude of said resistor.

6. Direction-finder means, comprising a radio receiver including detector means and display means with means for presenting nulls of the envelope output of said detector means, said detector means comprising a half-wave rectifier element in series with a load resistance, said rectifier element having a resistance characteristic increasing in the vicinity of zero input volts, whereby voltage output across said load resistance is non-linearly de-emphasized in the vicinity of zero input volts.

7. Direction-finder means according to claim 2, in which said circuit means includes a tank circuit capacitatively isolated from said reference connection, said parallel arms each being connected at one end to said tank circuit and at the other to said reference connection.

8. Direction-finder means, comprising a radio receiver including an intermediate-frequency circuit, a tank circuit connected to the output of said intermediate-frequency circuit, and detector means connected to said tank circuit, said detector means comprising first and second non-linear arms in parallel, said first non-linear arm being poled to clip positive voltages in tank-circuit output, and said second non-linear arm being poled oppositely to said first arm, said second arm comprising non-linear resistance means and linear resistance means in series, the maximum forward resistance of said non-linear resistance means being of the order of magnitude of said linear resistance means, and filter means at the output of said detector means.

References Cited in the file of this patent

UNITED STATES PATENTS

| | | |
|---|---|---|
| 2,044,789 | Hefele | June 23, 1936 |
| 2,074,408 | Lowell | Mar. 23, 1937 |
| 2,285,044 | Morris | June 2, 1942 |
| 2,301,607 | Bollinger et al. | Nov. 10, 1942 |
| 2,485,731 | Gruen | Oct. 25, 1949 |